United States Patent
Downing (10) Patent No.: US 10,638,038 B2
(45) Date of Patent: Apr. 28, 2020

(54) SYSTEM AND METHOD FOR ENHANCING THE INTRINSIC SPATIAL RESOLUTION OF OPTICAL SENSORS

(71) Applicant: STMicroelectronics (Research & Development) Limited, Marlow (GB)

(72) Inventor: James Peter Drummond Downing, Doune (GB)

(73) Assignee: STMICROELECTRONICS (RESEARCH & DEVELOPMENT) LIMITED, Marlow (GB)

( * ) Notice: Subject to any disclaimer, the term of this patent is extended or adjusted under 35 U.S.C. 154(b) by 55 days.

(21) Appl. No.: 15/661,321

(22) Filed: Jul. 27, 2017

(65) Prior Publication Data

US 2019/0037136 A1 Jan. 31, 2019

(51) Int. Cl.
H04N 5/232 (2006.01)
H04N 5/235 (2006.01)
H04N 5/225 (2006.01)
G01S 17/89 (2020.01)

(52) U.S. Cl.
CPC ......... *H04N 5/23232* (2013.01); *G01S 17/89* (2013.01); *H04N 5/2256* (2013.01); *H04N 5/2351* (2013.01); *H04N 5/2356* (2013.01)

(58) Field of Classification Search
CPC ............. H04N 5/23232; H04N 5/2256; H04N 5/2352; H04N 5/2351; H04N 5/2356; G01S 7/4865; G01S 17/10; G01S 17/89
See application file for complete search history.

(56) References Cited

U.S. PATENT DOCUMENTS

| | | | | |
|---|---|---|---|---|
| 2008/0279446 A1* | 11/2008 | Hassebrook | ....... | G01B 11/2513 382/154 |
| 2012/0257197 A1* | 10/2012 | Feldkhun | ........... | G01N 21/4795 356/301 |
| 2014/0253713 A1* | 9/2014 | Zhai | ........................ | H03K 21/38 348/80 |
| 2015/0260509 A1* | 9/2015 | Kofman | ............. | G01B 11/2504 356/601 |
| 2016/0157725 A1* | 6/2016 | Munoz | ................. | A61B 5/0077 600/430 |
| 2017/0146788 A1* | 5/2017 | Waller | ...................... | G06T 5/50 |
| 2018/0048811 A1* | 2/2018 | Waller | ................. | G02B 21/367 |

* cited by examiner

Primary Examiner — Nelson D. Hernández Hernández
(74) Attorney, Agent, or Firm — Slater Matsil, LLP (57) ABSTRACT

An embodiment method for enhancing the intrinsic spatial resolution of an optical sensor includes projecting, by an optical source of the optical sensor, a plurality of illumination patterns onto an object and detecting, by an optical detector of the optical sensor, reflected radiation for each of the plurality of illumination patterns. The method further includes generating, by a processor of the optical sensor, a plurality of sub-images, where each sub-image corresponds to a respective illumination pattern of the plurality of illumination patterns, each sub-image having a first image resolution. The method additionally includes reconstructing, by the processor and from the plurality of sub-images, an image having a second image resolution, the second image resolution being finer than the first image resolution.

21 Claims, 7 Drawing Sheets

SYSTEM AND METHOD FOR ENHANCING THE INTRINSIC SPATIAL RESOLUTION OF OPTICAL SENSORS

TECHNICAL FIELD

The present disclosure relates generally to optical sensors and in particular embodiments, to a system and method for enhancing the intrinsic spatial resolution of optical sensors.

BACKGROUND

An optical sensor typically includes a radiation source (e.g. a photon source) and a corresponding detector configured to generate a signal in response to radiation striking the detector. In some examples, the detector may include a number of radiation sensitive pixels (e.g. from a single pixel up to an array of pixels, for example, a 10×10 pixel array). The number of exposed radiation sensitive pixels may determine the intrinsic spatial resolution of the optical sensor, and the intrinsic spatial resolution of the optical sensor may determine the quality of images produced by the optical sensor.

Efforts to reduce the form factor and to limit power consumption of an optical sensor can have a detrimental effect on the quality of images produced by the optical sensor as the number of radiation sensitive pixels of the detector is reduced to achieve desired form factors. As such, there may be a need for a system and method for enhancing the intrinsic spatial resolution of the optical sensor, while simultaneously achieving the desired form factors and power consumption.

SUMMARY

In an embodiment, a method may include projecting, by an optical source of an optical sensor, a plurality of illumination patterns onto an object; and detecting, by an optical detector of the optical sensor, reflected radiation for each of the plurality of illumination patterns. The embodiment method further includes generating, by a processor of the optical sensor, a plurality of sub-images, each sub-image corresponding to a respective illumination pattern of the plurality of illumination patterns, each sub-image having a first image resolution; and reconstructing, by the processor and from the plurality of sub-images, an image having a second image resolution, the second image resolution being finer than the first image resolution.

In an embodiment, an optical sensor may include an optical source configured to irradiate an object with a plurality of incoherent illumination patterns in a plurality of exposures; and an optical detector configured to detect reflected radiation for each of the plurality of exposures. The embodiment optical sensor may further include a processor configured to generate a plurality of sub-images, each sub-image corresponding to a respective exposure of the plurality of exposures, each sub-image having an intrinsic resolution of the optical sensor, the processor being further configured to reconstruct, by compressed sensing, an image having a second image resolution finer than intrinsic resolution of the optical sensor.

In an embodiment, a method may include irradiating, by an optical source, at least a portion of an object in a plurality of exposures, wherein a same portion of the object is irradiated in each exposure, each exposure corresponding to a respective illumination pattern of a plurality of illumination patterns, a first one of the plurality of illumination patterns being uncorrelated with a second one of the plurality of illumination patterns. The embodiment method may further include detecting, by each pixel of an array of pixels, reflected radiation from the object in each exposure; and generating, by the processor, a plurality of sub-images, each sub-image corresponding to a respective exposure, each sub-image having a first spatial resolution. The embodiment method may further include generating, by the processor, an image from the plurality of sub-images using compressed sensing, the image having a second spatial resolution finer than the first spatial resolution.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Embodiments of this disclosure provide a system and method that avoid scanning readout or scanning emission by illuminating the same region of interest from one exposure to the next and by using all radiation sensitive pixels of an optical detector to detect reflected radiation, thereby maximizing signal detection at the optical detector and reducing the number of total exposures compared to a conventional compressed sensing system. Furthermore, since scanning readout or scanning emission is avoided, power consumption in the embodiment system and method is reduced compared to a conventional compressed sensing system.

Figure 1:
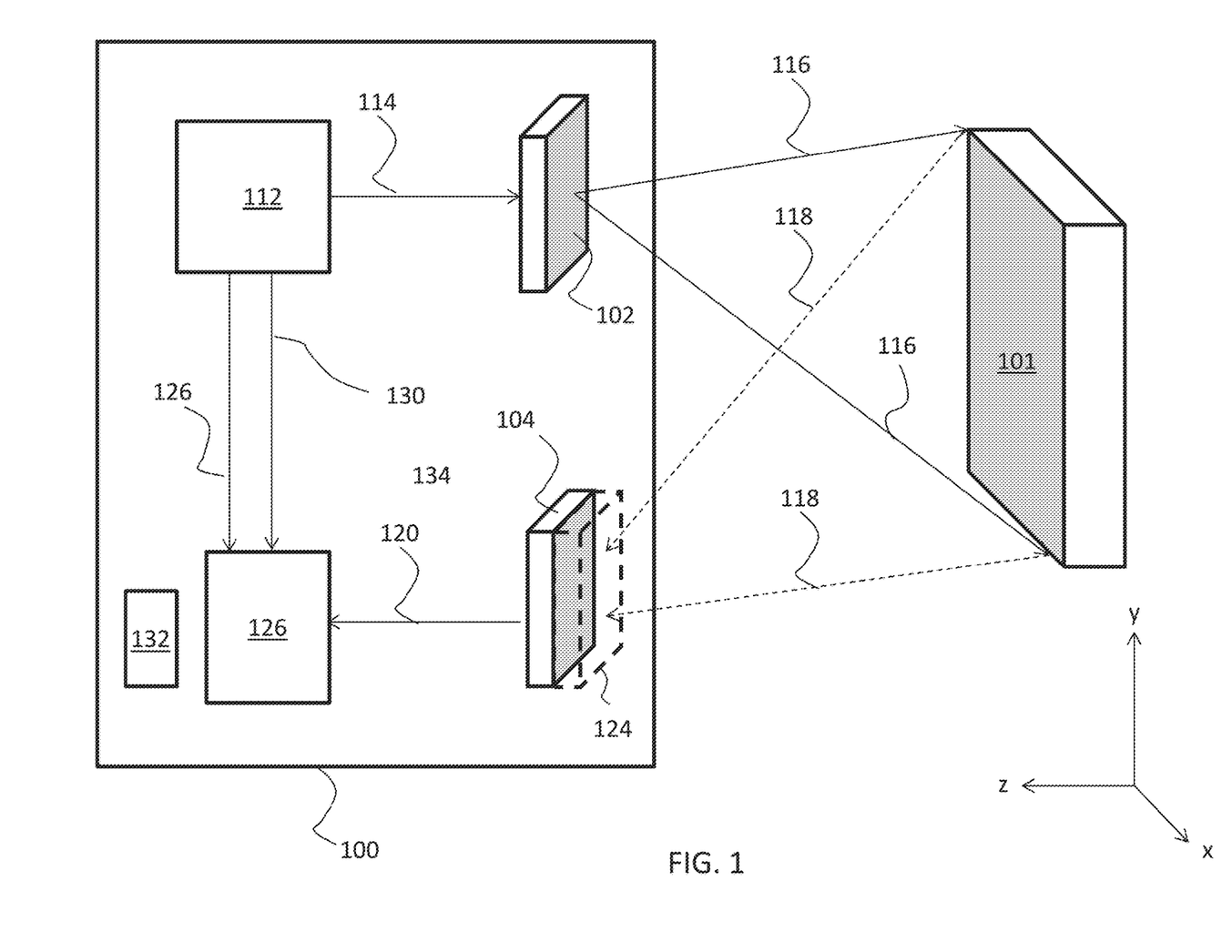
FIG. 1 shows a sensor and an object positioned in front of the sensor, in accordance with an embodiment.

FIG. 1 shows an optical system including an optical sensor 100 (hereinafter referred to as a "sensor") and an object 101 positioned in front of the sensor 100, in accordance with an embodiment. The sensor 100 may be used to determine the proximity of the object 101 to the sensor 100. For example, the object 101 may be a human hand and the sensor 100 may be used to detect the proximity of the human hand to a mobile communications device (e.g. a cell phone) that includes the sensor 100. The sensor 100 may also be used to capture or reconstruct an image (e.g. a two-dimensional (2D) or a three-dimensional (3D) image) of the object 101.

Figure 2A:
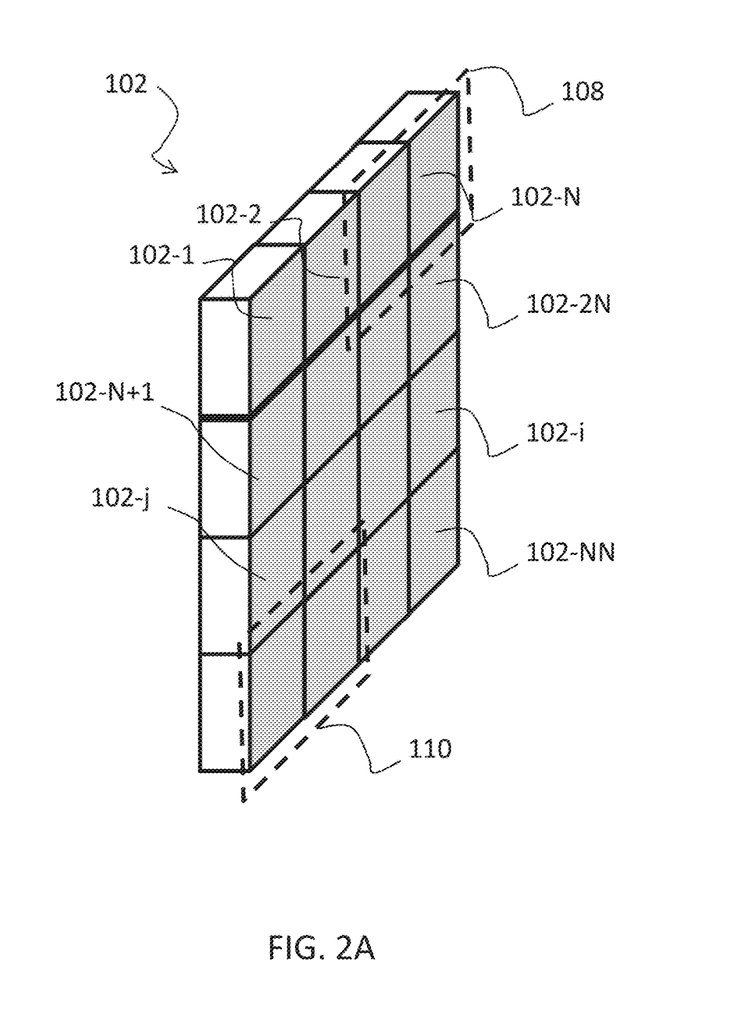
FIG. 2A shows an enlarged view of an optical source of the sensor shown in FIG. 1, in accordance with an embodiment.

The sensor 100 may include an optical source 102 and an optical detector 104. FIG. 2A shows an enlarged view of the optical source 102, in accordance with an embodiment. As depicted in FIG. 2A, the optical source 102 may include a plurality of optical emitters 102-1 to 102-NN arranged as an array. Although the example of FIG. 2A illustrates the optical emitters 102-1 to 102-NN as being arranged in a square N×N array, other array shapes (e.g. ellipsoidal arrays or circular-shaped arrays) may be possible in other embodiments. Each of the optical emitters 102-1 to 102-NN may include one or more infrared sources, modulated light emitting diodes (LEDs), or semiconductor lasers, or combinations thereof, although other types of optical emitters may be possible. In an embodiment where the optical emitters 102-1 to 102-NN include semiconductor lasers, an optical emitter 102-$i$ of the array of optical emitters 102-1 to 102-NN may include one or more vertical-cavity surface-emitting lasers (VCSELs), quantum well lasers, quantum cascade lasers, interband cascade lasers, or vertical external-cavity surface-emitting lasers (VECSELs), or the like.

The optical emitters 102-1 to 102-NN may be configured to operate at the same wavelength. In other embodiments, however, the optical emitters 102-1 to 102-NN may operate at different wavelengths. For example, different spatial regions 108 and 110 of the array of optical emitters 102-1 to 102-NN may operate at different wavelengths. The optical emitters 102-1 to 102-NN may exhibit continuous wave (CW) operation, quasi-continuous wave (QCW) operation, or pulsed operation.

Referring back to FIG. 1, the sensor 100 may include a programmable current driver 112. The operation of the optical emitters 102-1 to 102-NN may be controlled by the programmable current driver 112, which is configured to generate a drive current 114 that is capable of activating the array of optical emitters 102-1 to 102-NN, thereby causing the optical emitters 102-1 to 102-NN to emit photons. As an example, in pulsed operation, the drive current 114 provided to the optical emitters 102-1 to 102-NN of the optical source 102 may have a rise time and a fall time of about 100 picoseconds or less, thus allowing the programmable current driver 112 to modulate the optical emitters 102-1 to 102-NN of the optical source 102 at a frequency of 10 GHz or greater.

The array of optical emitters 102-1 to 102-NN may be an addressable array of optical emitters 102-1 to 102-NN. In other words, the array of optical emitters 102-1 to 102-NN may be operated in an addressable mode. As an example, the optical emitters 102-1 to 102-NN may be individually addressable, where an optical emitter 102-$i$ (shown in FIG. 2A) of the array of optical emitters 102-1 to 102-NN is addressable independently of another optical emitter 102-$j$ of the array of optical emitters 102-1 to 102-NN. In such an example, the drive current 114 provided by the programmable current driver 112 to the optical source 102 may cause optical emitter 102-$i$ to be activated (and thereby emit a photon), while simultaneously causing optical emitter 102-$j$ to be deactivated (and thereby not emit a photon). As another example, the optical emitters 102-1 to 102-NN may be addressable as a group or cluster, where one group 108 of optical emitters 102-1 to 102-NN is addressable independently of another group 110 of optical emitters 102-1 to 102-NN. In such an example, the drive current 114 provided by the programmable current driver 112 to the optical source 102 may cause the group 108 of optical emitters 102-1 to 102-NN to be activated (and thereby emit a photon), while simultaneously causing another group 110 of optical emitters 102-1 to 102-NN to be deactivated (and thereby not emit a photon). An effect of operating the array of optical emitters 102-1 to 102-NN in an addressable mode is the ability to dynamically reconfigure an illumination pattern of the optical source 102 and/or an intensity level of each of the optical emitters 102-1 to 102-NN of the array of optical emitters 102-1 to 102-NN to adapt to various applications or environments.

Radiation emanating from the optical source 102, collectively shown in FIG. 1 as reference numeral 116 using solid arrows, is incident upon the object 101. The incident radiation 116 is reflected off the object 101 to produce reflected radiation 118. It is noted that although incident radiation 116 and reflected radiation 118 are represented in FIG. 1 by few arrows, in practice, all radiation incident on and reflected from the object 101 may actually be combined in one beam or cone of radiation. While some part of the incident radiation 116 may be scattered depending upon the surface features of the object 101, a significant part of the incident radiation 116 is reflected, thereby producing the reflected radiation 118.

Figure 2B:
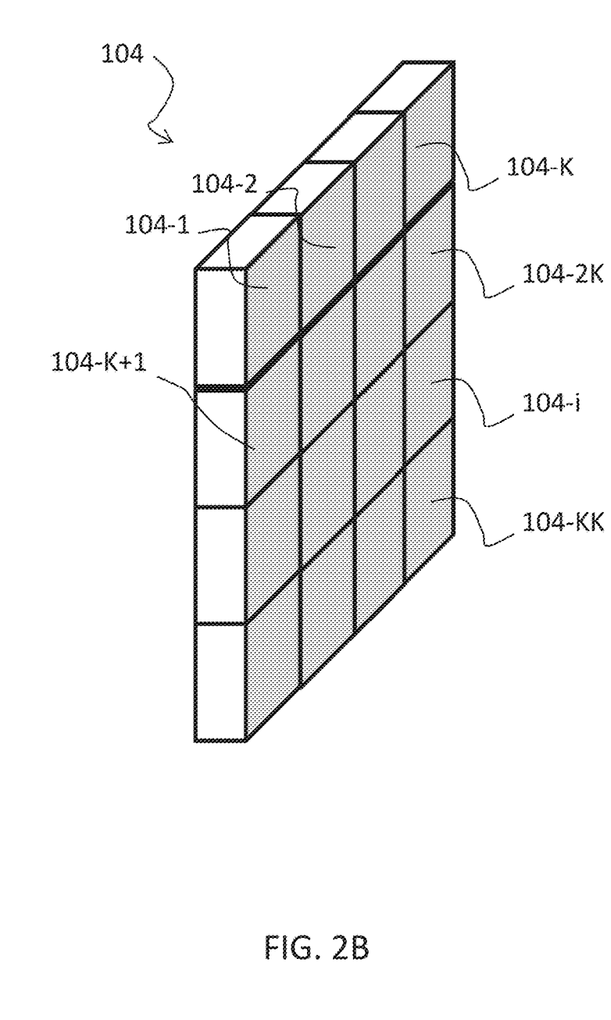
FIG. 2B shows an enlarged view of an optical detector of the sensor shown in FIG. 1, in accordance with an embodiment.

The optical detector 104 receives the reflected radiation 118 and generates an output signal 120 in response to the reflecting radiation 118 striking the optical detector 104. The output signal 120 may be a digital signal or an analog signal, depending on the circuitry of the optical detector 104. FIG. 2B shows an enlarged view of the optical detector 104, in accordance with an embodiment. As depicted in FIG. 2B, the optical detector 104 may include a plurality of radiation sensitive pixels 104-1 to 104-KK, examples being photo diodes (PDs), avalanche photo diodes (APDs), single-photon avalanche diodes (SPADs), or combinations thereof. Although the example of FIG. 2B illustrates the radiation sensitive pixels 104-1 to 104-KK as being arranged in a square K×K array, other array shapes (e.g. ellipsoidal arrays or circular-shaped arrays) may be possible in other embodiments. The intrinsic spatial resolution of the sensor 100 may be determined by the resolution of the optical detector 104. For example, since the radiation sensitive pixels 104-1 to 104-KK in the embodiment of FIG. 2B are arranged as a K×K array, the intrinsic spatial resolution of the sensor 100 may be a K×K image. It is noted that the output signal 120 may be expressed as a K×K matrix of measurements, or a 1×$K^2$ vector of measurements, with each entry of the matrix corresponding to the signal received from a respective pixel of the plurality of radiation sensitive pixels 104-1 to 104-KK.

Depending on the distance between the object 101 and the optical source 102, ambient or stray background radiation may be comparable to or even higher than the reflected radiation 118 received at the optical detector 104 and this can manifest itself as poor optical signal-to-noise ratio (OSNR). However, the undesirable effect of ambient or stray background radiation may be reduced by utilizing VCSEIS in the optical source 102, since VCSELS are configured to maintain a high intensity illumination on the object 101 even at relatively large distances between the object 101 and the optical source 102. Furthermore, radiation emitted from the array of VCSELs may be in a narrow wavelength band, and consequently, the effect of ambient or stray radiation may be reduced by placing an optional optical filter 124 having a pass band that matches the wavelength of the radiation emitted by the array of VCSELs at the optical source 102, thereby improving OSNR by filtering out ambient or stray radiation falling on the optical detector 104.

As shown in FIG. 1, the sensor 100 further includes a processor 126 configured to receive the output signal 120 and determine the proximity of the object 101 to the sensor 100 based on the output signal 120. The processor 126 can additionally reconstruct 2D or 3D images of the object 101 based on the output signal 120. Each of these capabilities of the sensor 100 is explained in the description that follows.

With regards to determining the proximity of the object 101 to the sensor 100, different modes for proximity sensing and distance measurement may be used. In the simplest mode for proximity sensing and distance measurement, the programmable current driver 112 is programmed to drive all the optical emitters 102-1 to 102-NN in the array simultaneously to generate an illumination (e.g. a uniform illumination) over an area or region of interest (e.g. over at least a portion of the object 101). The intensity of the incident radiation 116 is available to the processor 126 through a processing signal 128 that provided to the processor 126 by the programmable current driver 112. The processing signal 128 may include drive current information and one or more properties of the optical emitters 102-1 to 102-NN in the array of optical emitters 102-1 to 102-NN. The object 101, being present in the illuminated area, reflects the incident radiation 116 and the intensity of reflected radiation 118 may depend, at least in part, on the distance between the object 101 and the sensor 101 and/or surface features or textures of the object 101 that may scatter part of the incident radiation 116. In this mode of operation, the proximity measurement depends on the amount of radiation that is reflected off of the object 101.

The intensity of the reflected radiation 118, received at the optical detector 104, is compared to the intensity of the incident radiation 116. For example, the intensity of reflected radiation 118 from a part of the object 101 closer to the sensor 100 would be higher than the intensity received from a part of the object 101 farther from the sensor 100. Consequently, proximity of the object 101 (or of parts of the object 101) is determined, by the processor 126, by analyzing the relative intensities of the incident radiation 116 and the reflected radiation 118.

In a different mode for proximity sensing and distance measurement, the programmable current driver 112 is programmed to drive all the optical emitters 102-1 to 102-NN in the array of optical emitters 102-1 to 102-NN in a pulsed mode to generate short incident radiation pulses. The short radiation pulses from the optical source 102 illuminate the object lot in a predetermined timing sequence or at predetermined timing intervals. The object 101, being present in the illuminated area, reflects the pulsed incident radiation 116 and the arrival times of the pulses of reflected radiation 118 at the optical detector 104 are proportional to twice the distance between the object 101 and the sensor 100, based on the speed of light in the measurement medium or environment. For this mode for proximity sensing and distance measurement, the optical source 102 may include semiconductor lasers (e.g. VCSELs), while the optical receiver 104 may include high speed photodetectors (e.g. SPADs). For this mode for proximity sensing and distance measurement, the optical detector 104 is configured to record at least one of arrival times, pulse shapes, or intensities of the pulses of reflected radiation 118. The pulses of reflected radiation 118 arrive at different times at the optical detector 104, depending on the respective distances between the different parts of the object 101 and the sensor 100. The pulses of reflected radiation 118 are detected synchronously with a timing signal 130 that is configured to cause the programmable current driver 112 to generate the pulses of incident radiation 116. In effect, in this mode for proximity sensing and distance measurement, the processor 126 analyzes a time-of-flight ToF) between the pulses of incident radiation 116 travelling towards the object 101 and the pulses of reflected radiation 118 received at the optical detector 104 to determine the proximity of the object 101. A plurality of proximity measurements may be used to generate a comprehensive set of data to accurately determine both lateral spatial distances (e.g. in the x-y plane shown in FIG. 1) and depth (e.g. along the z-axis shown in FIG. 1).

In addition to determining the proximity of the object 101 to the sensor 100 based on the output signal 120, the processor 126 can also reconstruct 2D or 3D images of the object 101 based on the output signal 120. In general, to reconstruct a 2D image of the object 101 having L×L pixels, the K×K array of radiation sensitive pixels 104-1 to 104-KK at the optical detector 104 must be such that K is greater than or equal to L. Stated differently, the intrinsic spatial resolution of the sensor 100 may be a K×K pixel array and at least $L^2$ intensity measurements need to be made to reconstruct a 2D image of the object 101 having L×L pixels, consequently leading to the result that, in general, K is greater than or equal to L. Image quality depends, at least on part, on the number of radiation sensitive pixels 104-1 to 104-KK at the optical detector 104 (the intrinsic spatial resolution of the sensor 100) and/or the intensity of the incident radiation 116 striking the object 101. As such, efforts to reduce the form factor and limit power consumption of the sensor 100 have had a detrimental effect on the quality of images produced by the sensor 100, e.g., since the number of radiation sensitive pixels 104-1 to 104-KK at the optical detector 104 may be decreased by a greater proportion that the number of optical emitters 102-1 to 102-NN in an effort to achieve desired form factors while maintaining a suitable intensity for the incident radiation 116 striking the object 101.

Compressed sensing is a method of gaining spatial information about the object 101 using a known illumination source and limited sensing resolution. In other words, compressed sensing allows for the reconstruction of a 2D image of the object 101 having L×L pixels even when the number of intensity measurements or the number of pixels at the optical detector 104 is less than $L^2$. Typically, such a scenario produces an underdetermined linear equation system, which has infinitely many solutions. However, in compressed sensing, the fact that most data can be described sparsely in some basis, other than the normal pixel basis, is used to select a reconstruction basis that could produce the measurement results using the least number of non-zero basis coefficients (i.e., the sparsest description). The reconstruction basis can be the normal pixel basis or any basis that is suitable for describing the object 101 in a sparse way. For example, a scene including a few bright points in a dark background can be described by the normal pixel basis. On the other hand, a scene including several surfaces with different characteristics can instead be described by a wavelet basis.

In a typical compressed sensing system that constructs a 2D image of the object 101, the object 101 is illuminated by a series of illumination patterns based on a pixel regime coinciding with the desired resolution (e.g. an L×L pixel regime). In conventional compressed sensing systems, a single radiation sensitive pixel 104-$i$ of the plurality of radiation sensitive pixels 104-1 to 104-KK, free from an overlying optical element or lens, is used to detect the intensity of the reflected radiation 118 from the object 101 when a first illumination pattern is projected onto the object 101. The detected intensity is stored, e.g., in a memory 132 included in the sensor 100. Alternative patterns of illumination are subsequently projected, in a sequential matter, onto the object 101 and the intensity corresponding to each illumination pattern is detected (e.g. by a single radiation sensitive pixel) and also stored in the memory 132. Assuming E separate illumination patterns (also referred to E separate exposures), where $E \ll K^2 \ll L^2$, the processor 126 reconstructs, by linear processing, an L×L image from the E separate intensity measurements even though $E \ll K^2 \ll L^2$.

Mathematically, the above-described conventional method of compressed sensing may be expressed as follows. Suppose a vector f is an $L^2$-long vector (e.g. a $L^2 \times 1$ matrix) representing the image of the object 101 in the desired L×L pixel regime. Randomly selected illumination patterns by the array of optical emitters 102-1 to 102-NN onto the object 101 can be written as $L^2$-long vectors of zeroes and ones, placed as rows of a matrix $\Phi$. Supposing E separate illumination patterns are projected onto the object 101, thereby resulting in E intensity measurements, then the vector $\underline{b}$ containing the E measurement results is an E-long vector (e.g. an E×1 matrix) that may be represented as $\underline{b}=\Phi\underline{f}$. The vector $\underline{f}$ can also be described as $\underline{f}=\psi\underline{x}$, where $\psi$ is a basis matrix containing all the basis vectors for the reconstruction basis, and where $\underline{x}$ is the $L^2$-long vector (e.g. a $L^2 \times 1$ matrix) representing the object 101 in the reconstruction basis. If the normal pixel basis is used for reconstruction, then $\psi$ is the identity matrix. For compressed sensing to work, the matrices $\psi$ and $\Phi$ are preferably incoherent or uncorrelated to each other. This condition may be satisfied for reconstruction bases when a random or pseudo-random illumination pattern is used from one measurement (or exposure) to the next. It is noted also that for compressed sensing to work, the vector $\underline{x}$ should be a sparse vector with only a small number of non-zero values. The problem to solve can then be written as $\underline{b}=\Phi\psi\underline{x}=A\underline{x}$, where A is an $E \times L^2$ matrix with $E \ll L^2$. The solution to this underdetermined linear equation system can, according to the theory of compressed sensing, be found by minimization of the L1-norm, which is the sum of the absolute values of all coefficients in the vector $\underline{x}$, while satisfying $\underline{b}=\Phi\psi\underline{x}$. In other words, the optimization problem reduces to $x=\arg\min \|x\|_1$, such that $\underline{b}=\Phi\psi\underline{x}$. This optimization problem is also known as a basis pursuit.

A variation to the above-described method of compressed sensing is to implement a scanning readout of at least some pixels of the plurality of radiation sensitive pixels 104-1 to 104-KK in response to each illumination pattern being projected onto the object 101, thereby increasing the number of intensity measurements for each of the E separate illumination patterns. Another variation to the above-described method of compressed sensing is to illuminate the object 101 using a scanning emission where the optical source 102 sequentially projects incident radiation 116 on different areas of the object 101 as time progresses and using all radiation sensitive pixels 104-1 to 104-KK to detect the intensity of the reflected radiation 118 from the object 101.

The conventional method of compressed sensing and its above-described variations are inefficient since all the reflected radiation 118 striking the optical detector 104 is not detected or measured (e.g. since a single radiation sensitive pixel 104-$i$ of the plurality of radiation sensitive pixels 104-1 to 104-KK is used at a given instance of time). Furthermore, since only a single radiation sensitive pixel 104-$i$ of the plurality of radiation sensitive pixels 104-1 to 104-KK is used at a given instance of time, the number of exposures E may be unnecessarily high, even though $E \ll K^2 \ll L^2$. In other words, the full extent to which the number of exposures E can be decreased may not be realized in a conventional method of compressed sensing (or its variations) since only a single radiation sensitive pixel 104-$i$ of the plurality of radiation sensitive pixels 104-1 to 104-KK is used at a given instance of time. Additionally, since the number of exposures E may be unnecessarily high in a conventional method of compressed sensing, the power consumption of the sensor 100 may also be unnecessarily high. In other words, the full extent to which the power consumption of the sensor 100 can be decreased may not be realized in a conventional method of compressed sensing (or its variations) since only a single radiation sensitive pixel 104-$i$ of the plurality of radiation sensitive pixels 104-1 to 104-KK is used at a given instance of time. In view of at least these factors, there is a need for a system and method for enhancing the intrinsic spatial resolution of the sensor 100, while, at the same time, minimizing power consumption and the number of exposures E needed and maximizing signal detection at the optical detector 104. Embodiments of this disclosure meet this need and provide the desired minimization of power consumption and of the number of exposures E, while maximizing signal detection at the optical detector 104.

Figure 3A:
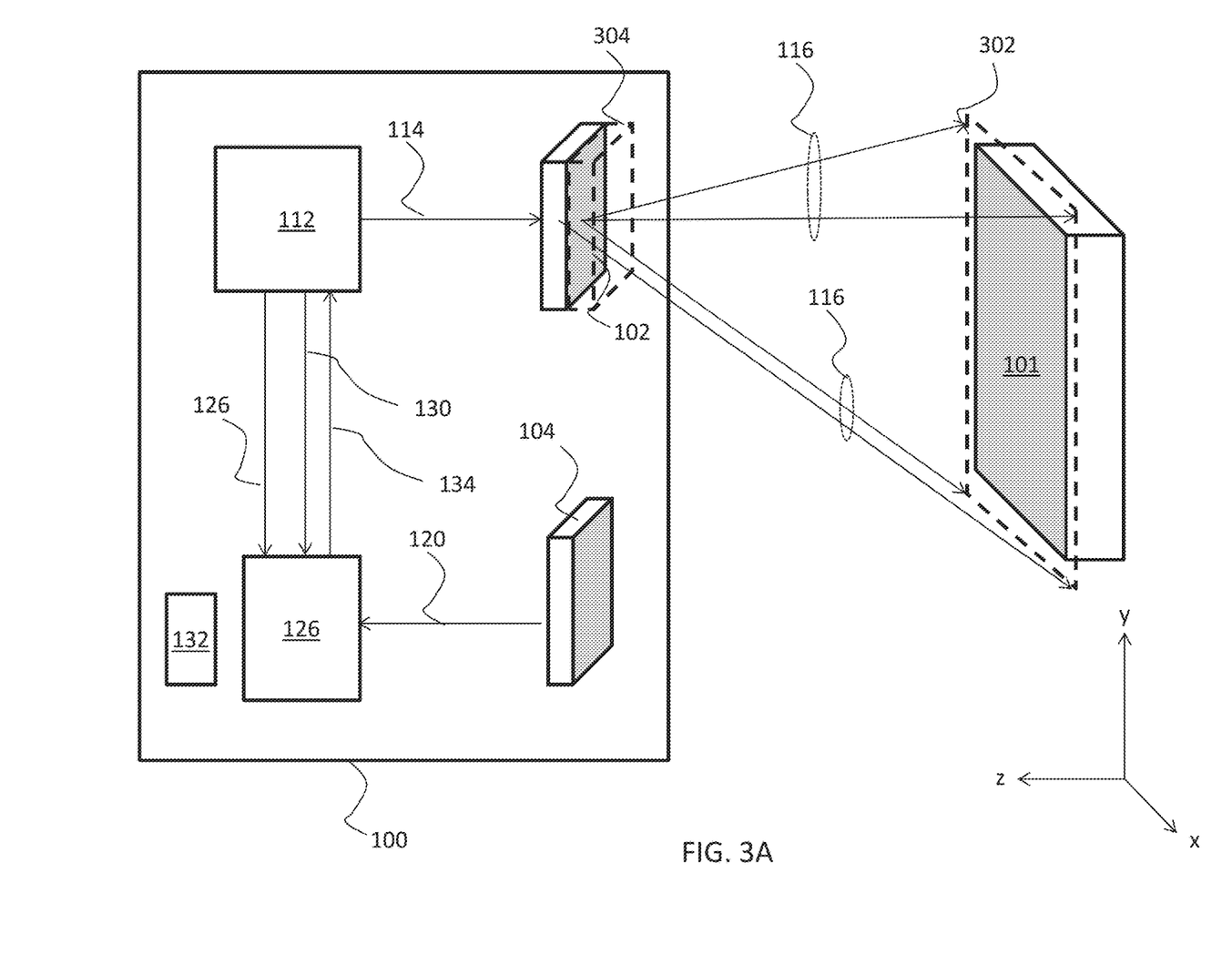
FIGS. 3A to 3B illustrate a series of steps of a method for reconstructing a 2D or 3D image of an object that enhances the intrinsic spatial resolution of the sensor shown in FIG. 1, in accordance with an embodiment.
Figure 3B:
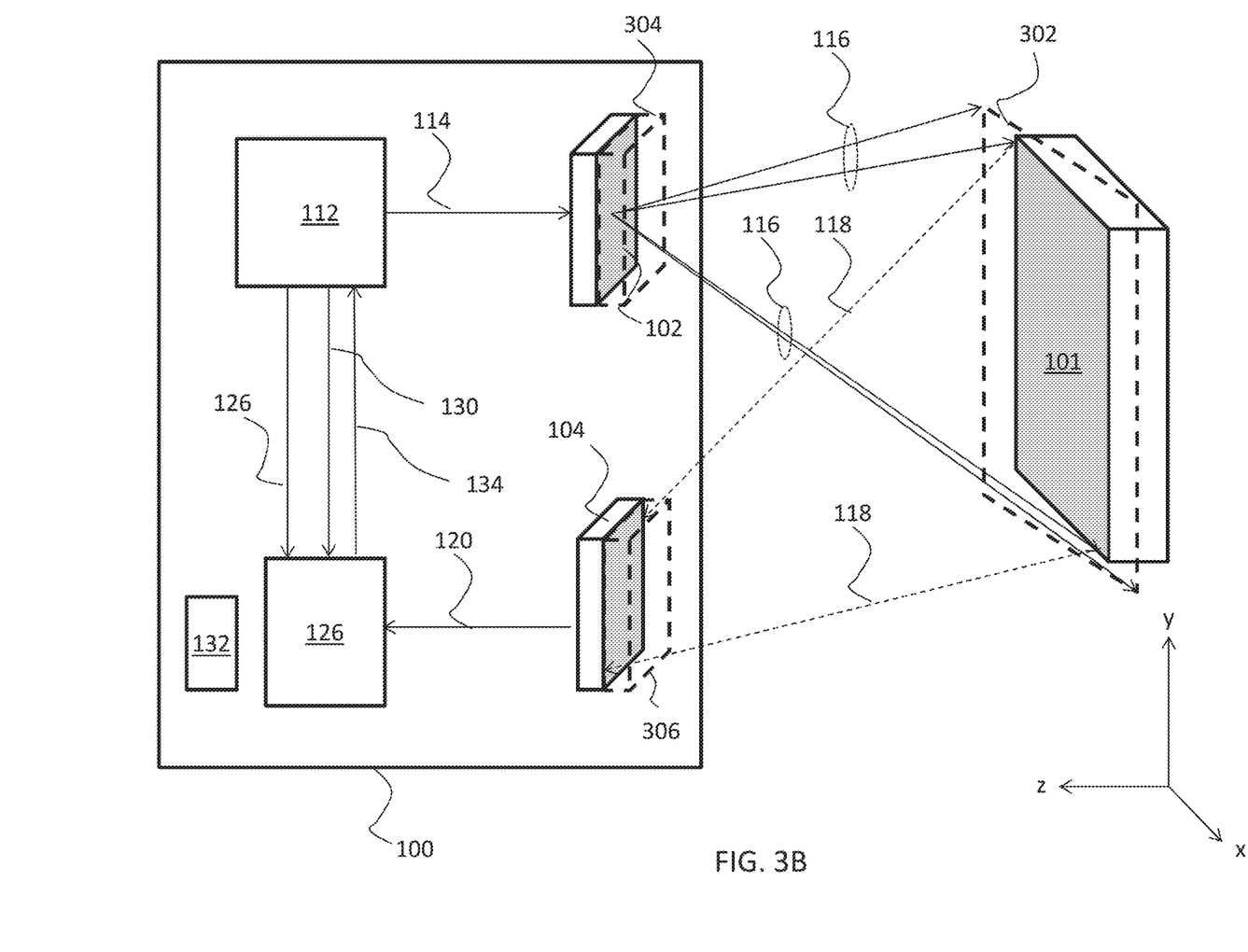

FIGS. 3A to 3B illustrate a series of steps of a method for reconstructing a 2D or 3D image of the object 101 based on the output signal 120 that enhances the intrinsic spatial resolution of the sensor 100, in accordance with an embodiment. In essence, the steps of FIGS. 3A to 3B provide a hybrid of ToF imaging and compressive sensing system with an intrinsic resolution that is augmented by multiple exposures of an entire scene under different illumination conditions (e.g. illumination patterns). As shown in FIG. 3A, the object 101 is irradiated, in a first exposure $E_1$, with incident radiation 116. The optical source 102 of the sensor 100 generates an illumination pattern 302 that is projected onto the object 101 or a region of interest of the object 101. In the example of FIG. 3A, the illumination pattern 302 is projected onto the entire object 101. However, in other embodiments, the illumination pattern 302 may be projected onto a portion less than the entirety of the object 101. In general, the object 101 may be located in the far field of the optical source 102 and, equivalently, of the incident radiation 116. As will be evident in the description below, the object 101 is sequentially exposed (e.g. in a plurality of exposures E1 to $E_M$) to a plurality of illumination patterns 302. The illumination pattern 302 illuminates the same region of emission from the sensor 100 for each of the plurality of exposures E1 to $E_M$. In other words, each exposure E1 to $E_M$ irradiates the same portion of the object 101. Furthermore, the illumination pattern 302 is changed for each exposure E1 to $E_M$. As described above in respect of the conventional method of compressed sensing, for compressed sensing to work, the above-described matrices w and D are preferably incoherent or uncorrelated to each other. Hence, a design of the illumination pattern 302 (e.g. fine details of the illumination pattern 302) may appear to be random or pseudo-random for each exposure E1 to $E_M$.

In some embodiments, the optical source 102 may be coupled to an optical element 304, and the illumination pattern 302 may be formed on the object 101 using the combination of the optical source 102 and the optical element 304. For example, the optical element 304 may include an array of diffractive optical elements, and the optical source 102 may include an addressable array of optical emitters 102-1 to 102-NN (e.g. VCSELs). In such an embodiment, the illumination pattern 302 produced at each exposure may depend on the illumination of the array of diffractive optical elements by the addressable array of optical emitters 102-1 to 102-NN. In this embodiment, the illumination pattern 302 may be changed from one exposure to the next by relying on an addressable nature of the optical source 102. However, in other embodiments, the optical element 304 may include a freeform refractive optical element, examples being a digital mirror device (DMD), a spatial light modulator (SLM), or the like. In embodiments that include a DMD or SLM over the optical source 102, the illumination pattern 302 may be changed from one exposure to the next by modulating the optical element 304, and thus, the addressable nature of the optical source 102 need not be relied on in such embodiments.

Figure 4A:
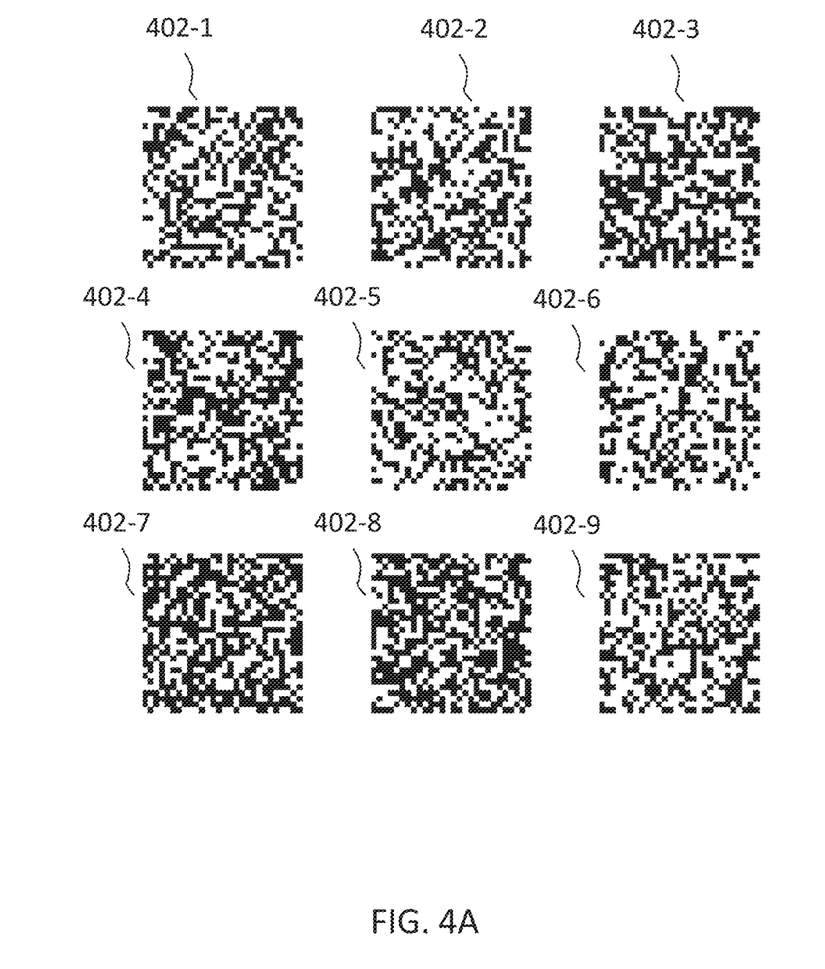
FIG. 4A shows a series of nine pseudo-random illumination patterns, based on a 28×28 pixel pattern, in accordance with an embodiment.
Figure 4B:
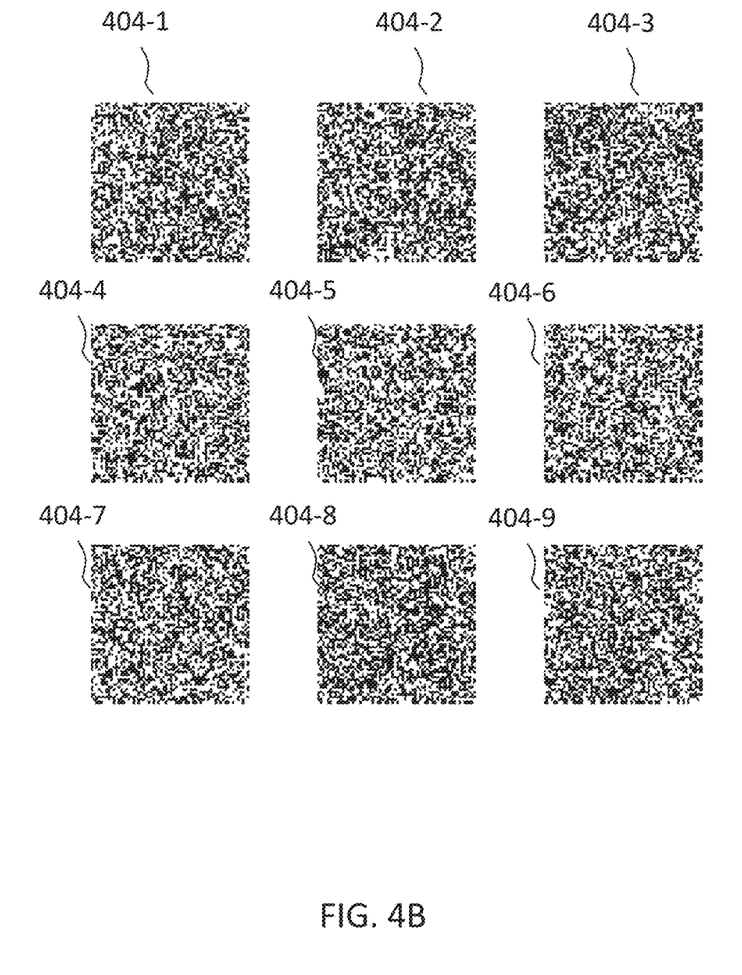
FIG. 4B shows another series of nine pseudo-random illumination patterns, based on a 64×64 pixel pattern, in accordance with an embodiment.

FIG. 4A shows a series of nine illumination patterns 302, based on a 28×28 pixel pattern, in accordance with an embodiment. FIG. 4B shows another series of nine illumination patterns 302, based on a 64×64 pixel pattern, in accordance with an embodiment. Illustratively, when a 28×28 pixel illumination pattern 302 is used to irradiate the object 101, the first exposure E1 may use the illumination pattern 402-1, the second exposure E2 may use the illumination pattern 402-2, the third exposure E3 may use the illumination pattern 402-3, and so on. In FIG. 4A, each of the illumination patterns 402-1 to 402-9 illuminates the same region of emission from the sensor 100; however, the design and fine-details in the illumination patterns 402-1 to 402-9 change from one exposure to the next. For example, portions of the first exposure E1 that appear bright (e.g. due to constructive interference at these portions of the illumination pattern 402-1) may appear dark in the second exposure E2 (e.g. due to destructive interference at these portions of the illumination pattern 402-2), and so on, thereby giving the appearance that the design of the illumination patterns 402-1 to 402-9 is random or pseudo-random for each exposure E1 to $E_9$. A similar observation is seen in FIG. 4B, where each of the illumination patterns 404-1 to 404-9 illuminates the same region of emission from the sensor 100 and the design of the illumination patterns 404-1 to 404-9 (e.g. fine details) appears to be random or pseudo-random for each exposure E1 to $E_9$.

The illumination pattern 302 is changed from one exposure to the next. In some embodiments, the illumination pattern 302 for each exposure may be dynamically generated by the sensor 100 (e.g. the controller 126 of the sensor 100). In such embodiments, the processor 126 may generate (e.g. randomly or pseudo-randomly generate) the illumination pattern 302 for a respective exposure and provide a control signal 134 (shown in FIG. 3A) to the programmable current driver 112, which in turn generates the drive current 114 for the optical source 102 based on the control signal 134 to realize the illumination pattern 302 determined by the processor 126. However, in other embodiments, the illumination pattern 302 for each exposure may be a hard-coded pattern (e.g. stored in memory 132). In such embodiments, the illumination pattern 302 for each exposure may be determined in the design phase of the sensor 100 and may be an intrinsic function of the combination of the optical sensor 102 and the optical element 304. In examples where the illumination pattern 302 is hard-coded for each exposure, the processor 126 may access the memory 132 at each exposure and provide a respective control signal 134 to the programmable current driver 112, which in turn generates the drive current 114 for the optical source 102 based on the control signal 134 to realize the hard-coded illumination pattern 302 for the given exposure.

As shown in FIG. 3B, in the first exposure $E_1$, the incident radiation 116 strikes the object 101 and reflects off the object 101 and travels towards the sensor 100, striking the optical detector 104 of the sensor 100 as reflected radiation 118. In contrast to conventional compressed sensing, each radiation sensitive pixel 104-$i$ of the plurality of radiation sensitive pixels 104-1 to 104-KK is used to detect the reflected radiation 118. The optical detector 104 generates the output signal 120, which is provided to the processor 126. As with the method of determining the proximity of the object 101 to the sensor 100, the processor 126 may utilize either the intensity of the reflected radiation 118 or a time-of-flight between the pulses of incident radiation 116 travelling towards the object 101 and the pulses of reflected radiation 118 received at the optical detector 104 to reconstruct a 2D or 3D image of the object 101 based on the output signal 120.

With respect to using the intensity of the reflected radiation 118 to reconstruct a 2D or 3D image of the object 101 based on the output signal 120, the programmable current driver 112 drives the optical emitters 102-1 to 102-NN and/or the optical element 304 to generate the illumination pattern 302 onto the object 101. The intensity of reflected radiation 118 may depend, at least in part, on surface features or textures of the object 101 that may scatter part of the incident radiation 116. In this mode of operation, the 2D image of the object 101 depends on the amount of radiation that is reflected off of the object 101. In other words, the 2D image of the object 101 may be a 2D intensity map that is representative of the surface features or textures of the object 101. The intensity of the reflected radiation 118, received at the optical detector 104 for the first exposure E1 and output from the optical detector 104 as output signal 120, is stored in the memory 132.

With respect to using ToF to reconstruct a 2D or 3D image of the object 101 based on the output signal 120, the programmable current driver 112 drives the optical emitters 102-1 to 1002-NN in a pulsed mode to generate the illumination pattern 302, as short incident radiation pulses, onto the object 101. The short radiation pulses from the optical source 102 illuminate the object 101 in a predetermined timing sequence or at predetermined timing intervals. The object 101, being present in the illuminated area, reflects the pulsed incident radiation 116 and the arrival times of the pulses of reflected radiation 118 at the optical detector 104 are proportional to twice the distance between the object 101 and the sensor 100, based on the speed of light in the measurement medium or environment. For this mode for reconstructing the image of the object 101, the optical source 102 may include semiconductor lasers (e.g. VCSELs), while the optical receiver 104 may include high speed photodetectors (e.g. SPADs). The pulses of reflected radiation 118 arrive at different times at the optical detector 104, depending on respective distances of different parts of the object 101 they are reflected off and their distance from the sensor 100. The pulses of reflected radiation 118 are detected synchronously with the timing signal 130. The output signal 120 generated by the optical detector 104 essentially represents range data or a depth map (e.g. a 3D depth map) that is representative of lateral spatial distances (e.g. in the x-y plane shown in FIG. 3B) and depth (e.g. along the z-axis shown in FIG. 3B). The depth map, output from the optical detector 104 as output signal 120, is stored in the memory 132.

In some embodiments, an optical element 306 (e.g. one or more return lenses) may be present over the surface of the optical detector 104 directed towards the object 101. In such embodiments, the optical element 306 may function to focus the reflected radiation 118 to each of the plurality of radiation sensitive pixels 104-1 to 104-KK. The depth map generated from a system having the optical element 306 may have a higher resolution than the depth map generated from a system devoid of the optical element 306 since more reflected radiation 118 is focused into each of the plurality of radiation sensitive pixels 104-1 to 104-KK in the system having the optical element 306.

The steps described above in respect of FIGS. 3A and 3B are subsequently repeated for a second exposure E2, a third exposure E3, and so on until the prescribed number of exposures $E_M$ are completed. In embodiments where the sensor 100 can dynamically adjust the illumination pattern 302, the prescribed number of exposures $E_M$ may be determined by a reconstruction satisfying a given criteria, whereby necessary exposures may be fewer than the number it is possible to generate with the sensor 100. However, in embodiments where the illumination pattern 302 for each exposure is hard-coded by the individual optical source 102—optical element 304 channel (e.g. VCSEL and optic channels), the number of exposures $E_M$ may be limited to a finite maximum. Therefore, the number of optical channels (which affects the number of exposures $E_M$) may be determined in the design phase of the sensor 100, where certain signal and resolution criteria, manufacturability, and cost are addressed. In each exposure, the output signal 1200, expressed as an intensity map or a depth/range map, is stored in the memory 132. The data stored in each exposure E1 to $E_M$ may be referred to as sub-images. After the prescribed number of exposures $E_M$ is completed, the processor 126 may conducts post-processing of the sub-images stored in the memory 132 to reconstruct, using compressed sensing techniques, a 2D or 3D image of the object 101, expressed as an intensity map or a depth/range map, having a spatial resolution that is greater than the K×K intrinsic resolution of the sensor 100.

The processor 126 may implement a basis pursuit to reconstruct the 2D or 3D image of the object 101. Basis pursuit can be solved with linear programming techniques whose computational complexities are a polynomial in L. While reconstruction based on linear programming is one example, other reconstruction examples include iterative orthogonal matching pursuit (OMP), matching pursuit, tree matching pursuit, or the like.

It is noted that while the above description envisions embodiments where the sensor 100 includes the processor 126 that reconstructs the 2D or 3D image of the object 101, the present disclosure also contemplates embodiments where the sensor 100 functions as a dumb data-gathering device and where a host (e.g. a mobile phone), which is communicatively coupled to the sensor 100, processes the data stored in each exposure E1 to $E_M$ to reconstruct the 2D or 3D image of the object 101.

Figure 5:
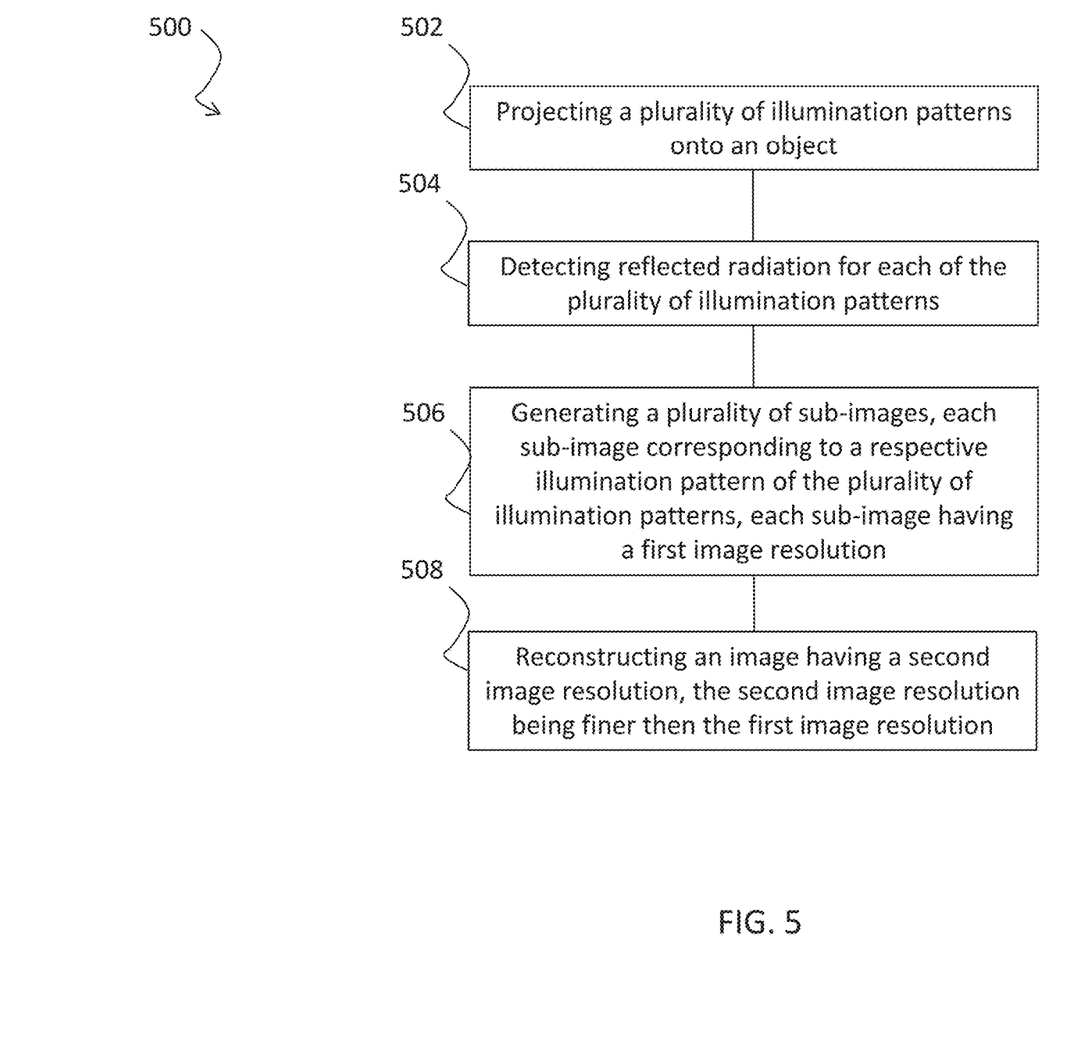
FIG. 5 shows a flow chart illustrating a method for enhancing the intrinsic spatial resolution of a sensor, in accordance with an embodiment.

FIG. 5 shows a method 500 for enhancing the intrinsic spatial resolution of the sensor 100, in accordance with an embodiment. The method 500 includes projecting (e.g. by the optical source 102) a plurality of illumination patterns 302 onto the object 101 (in 502). The method 500 further includes detecting (e.g. by the optical detector 104) reflected radiation 118 for each of the plurality of illumination patterns 302 (in 504). The method 500 also includes generating (e.g. by the processor 126) a plurality of sub-images, each sub-image corresponding to a respective illumination pattern of the plurality of illumination patterns 302, each sub-image having a first image resolution, e.g., the intrinsic resolution of the sensor 100 (in 506). The method 500 additionally includes reconstructing (e.g. by the processor 126), from the plurality of sub-images, an image having a second image resolution, the second image resolution being finer then the first image resolution (in 508).

The above-described embodiments illustrate a system and method that enhances the intrinsic resolution of the sensor 100 using compressed sensing. In contrast to conventional compressed sensing, the disclosed embodiments provide a system and method that avoid scanning readout or scanning emission by illuminating the same region of interest from one exposure to the next and by using all radiation sensitive pixels of the plurality of radiation sensitive pixels 104-1 to 104-KK to detect the reflected radiation 118, thereby maximizing signal detection at the optical detector 104 and reducing the number of total exposures $E_M$ compared to a conventional compressed sensing system. Furthermore, since scanning readout or scanning emission is avoided, power consumption in the disclosed system and method is reduced compared to a conventional compressed sensing system.

In an embodiment, a method may include projecting, by an optical source of an optical sensor, a plurality of illumination patterns onto an object; and detecting, by an optical detector of the optical sensor, reflected radiation for each of the plurality of illumination patterns. The embodiment method further includes generating, by a processor of the optical sensor, a plurality of sub-images, each sub-image corresponding to a respective illumination pattern of the plurality of illumination patterns, each sub-image having a first image resolution; and reconstructing, by the processor and from the plurality of sub-images, an image having a second image resolution, the second image resolution being finer than the first image resolution.

In an embodiment, an optical sensor may include an optical source configured to irradiate an object with a plurality of incoherent illumination patterns in a plurality of exposures; and an optical detector configured to detect reflected radiation for each of the plurality of exposures. The embodiment optical sensor may further include a processor configured to generate a plurality of sub-images, each sub-image corresponding to a respective exposure of the plurality of exposures, each sub-image having an intrinsic resolution of the optical sensor, the processor being further configured to reconstruct, by compressed sensing, an image having a second image resolution finer than intrinsic resolution of the optical sensor.

In an embodiment, a method may include irradiating, by an optical source, at least a portion of an object in a plurality of exposures, wherein a same portion of the object is irradiated in each exposure, each exposure corresponding to a respective illumination pattern of a plurality of illumination patterns, a first one of the plurality of illumination patterns being uncorrelated with a second one of the plurality of illumination patterns. The embodiment method may further include detecting, by each pixel of an array of pixels, reflected radiation from the object in each exposure; and generating, by the processor, a plurality of sub-images, each sub-image corresponding to a respective exposure, each sub-image having a first spatial resolution. The embodiment method may further include generating, by the processor, an image from the plurality of sub-images using compressed sensing, the image having a second spatial resolution finer than the first spatial resolution.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices and processing systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
projecting, by an optical source of an optical sensor, a plurality of illumination patterns onto an object, wherein the optical source comprises an addressable array of a plurality of optical emitters, and wherein the plurality of illumination patterns is generated sequentially by
operating the plurality of optical emitters in an addressable mode in which each of the plurality of optical emitters is addressable independent of another one of the plurality of optical emitters,
driving the plurality of optical emitters in a pulsed mode to generate each of the plurality of illumination patterns by using the addressable array to selectively activate selected ones of the plurality of optical emitters of the optical source, each of the plurality of illumination patterns comprising a plurality of pulses;
detecting, by an optical detector of the optical sensor, reflected radiation for each of the plurality of illumination patterns, wherein the optical detector comprises a plurality of radiation sensitive pixels, and wherein detecting the reflected radiation for each of the plurality of illumination patterns comprises detecting the reflected radiation at all of the plurality of radiation sensitive pixels of the optical detector for each of the plurality of illumination patterns;
generating, by a processor of the optical sensor, a plurality of sub-images, each sub-image corresponding to a respective illumination pattern of the plurality of illumination patterns, each sub-image comprising a depth map and having a first image resolution; and
reconstructing from the plurality of sub-images, by the processor, an image comprising a depth map and having a second image resolution, the second image resolution being finer than the first image resolution.

2. The method of claim 1, wherein the plurality of illumination patterns comprise uncorrelated illumination patterns.

3. The method of claim 1, further comprising:
pseudo-randomly generating, by the processor, a series of illumination patterns, the plurality of illumination patterns comprising the series of illumination patterns.

4. The method of claim 3, wherein pseudo-randomly generating the series of illumination patterns comprises pseudo-randomly generating the series of illumination patterns according to the second image resolution.

5. The method of claim 1, wherein the plurality of illumination patterns comprise hard-coded illumination patterns of the plurality of optical emitters of the optical source determined during a design phase of the optical sensor.

6. The method of claim 1, wherein reconstructing, by the processor and from the plurality of sub-images, the image having the second image resolution comprises reconstructing, using compressive sensing processing the image from the plurality of sub-images.

7. The method of claim 1, wherein the first image resolution corresponds to an intrinsic resolution of the optical sensor.

8. The method of claim 1, wherein projecting the plurality of illumination patterns onto the object comprises irradiating a same region of the object in a plurality of exposures.

9. An optical sensor, comprising:
an optical source comprising an addressable array of a plurality of optical emitters configured to irradiate an object with a plurality of incoherent illumination patterns in a plurality of exposures, wherein the optical source is configured to sequentially generate the plurality of incoherent illumination patterns by
operating the plurality of optical emitters in an addressable mode in which each of the plurality of optical emitters is addressable independent of another one of the plurality of optical emitters, driving the plurality of optical emitters in a pulsed mode to generate each of the plurality of illumination patterns by using the addressable array to selectively activate selected ones of the plurality of optical emitters of the optical source, each of the plurality of illumination patterns comprising a plurality of pulses;

an optical detector configured to detect reflected radiation for each of the plurality of exposures, wherein the optical detector comprises a plurality of radiation sensitive pixels, and wherein the optical detector is configured to detect, for each of the plurality of illumination patterns, the reflected radiation by detecting the reflected radiation at all of the plurality of radiation sensitive pixels of the optical detector for each of the plurality of illumination patterns;

a processor; and a memory storing a program to be executed in the processor, the program comprising instructions for:

generating a plurality of sub-images, each sub-image corresponding to a respective exposure of the plurality of exposures, each sub-image comprising a depth map and having an intrinsic resolution of the optical sensor, reconstructing, by compressed sensing, an image comprising a depth map and having a second image resolution finer than intrinsic resolution of the optical sensor.

10. The optical sensor of claim 9, wherein the optical detector is configured to irradiate a same region of the object in each exposure of the plurality of exposures.

11. The optical sensor of claim 9, wherein the plurality of sub-images comprise an intensity map of the reflected radiation.

12. The optical sensor of claim 9, wherein the plurality of sub-images comprise a depth map indicative of a distance of portions of the object from the optical sensor.

13. The optical sensor of claim 9, wherein the optical detector comprises an array of pixels, and wherein each pixel of the array of pixels is configured to detect the reflected radiation in each exposure of the plurality of exposures.

14. The optical sensor of claim 9, wherein a respective incoherent illumination pattern is projected onto the object in a respective exposure.

15. The optical sensor of claim 9, further comprising a programmable current driver configured to generate a drive current capable of activating the optical source to irradiate the object with the plurality of incoherent illumination patterns in the plurality of exposures.

16. The optical sensor of claim 9, wherein the plurality of optical emitters of the optical source comprises an addressable array of semiconductor lasers.

17. The optical sensor of claim 16, wherein the addressable array of semiconductor lasers comprises one or more vertical-cavity surface-emitting lasers (VCSELs), quantum well lasers, quantum cascade lasers, interband cascade lasers, or vertical external-cavity surface-emitting lasers (VECSELs).

18. The optical sensor of claim 9, wherein the optical detector comprises an array comprising a plurality of photo diodes (PDs), avalanche photo diodes (APDs), or single-photon avalanche diodes (SPADs), the array determining the intrinsic resolution of the optical sensor.

19. A method, comprising:

irradiating, by an optical source, at least a portion of an object in a plurality of exposures, wherein a same portion of the object is irradiated in each exposure, each exposure corresponding to a respective illumination pattern of a plurality of illumination patterns, a first one of the plurality of illumination patterns being uncorrelated with a second one of the plurality of illumination patterns, wherein the plurality of illumination patterns is sequentially generated by operating an addressable array of a plurality of optical emitters in an addressable mode in which each of the plurality of optical emitters is addressable independent of another one of the plurality of optical emitters, generating each of the plurality of illumination patterns by using the addressable array to selectively activate selected ones of a plurality of optical emitters of the optical source, each of the plurality of illumination patterns comprising a plurality of pulses;

detecting, by each pixel of an array of pixels, reflected radiation from the object in each exposure synchronously with a timing signal, the reflected radiation comprising the plurality of pulses;

generating, by a processor, a plurality of sub-images, each sub-image corresponding to a respective exposure, each sub-image having a first spatial resolution, wherein generating each of the plurality of sub-images comprises generating a depth map representative of lateral spatial distances and depth from the reflected radiation; and generating, by the processor, an image from the plurality of sub-images using compressed sensing, the image comprising a depth map and having a second spatial resolution finer than the first spatial resolution.

20. The method of claim 19, wherein generating, by the processor, the image from the plurality of sub-images using compressed sensing comprises at least one of a basis pursuit, an iterative orthogonal matching pursuit (OMP), a matching pursuit, or a tree matching pursuit.

21. The method of claim 19, wherein the plurality of illumination patterns comprise predetermined illumination patterns stored in a memory.

* * * * *